(12) United States Patent
Sun et al.

(10) Patent No.: US 8,615,713 B2
(45) Date of Patent: Dec. 24, 2013

(54) MANAGING DOCUMENT INTERACTIONS IN COLLABORATIVE DOCUMENT ENVIRONMENTS OF VIRTUAL WORLDS

(75) Inventors: Tong Sun, Penfield, NY (US); Jonas Karlsson, Rochester, NY (US); Wei Peng, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 462 days.

(21) Appl. No.: 12/492,709

(22) Filed: Jun. 26, 2009

(65) Prior Publication Data

US 2010/0332980 A1 Dec. 30, 2010

(51) Int. Cl.
*G06F 3/00* (2006.01)

(52) U.S. Cl.
USPC .......................................... 715/757; 715/804

(58) Field of Classification Search
USPC ............... 715/752–757, 758, 748, 854–855, 715/705–712, 734–739, 804–805
See application file for complete search history.

(56) References Cited

U.S. PATENT DOCUMENTS

| | | | |
|---|---|---|---|
| 5,930,801 A | 7/1999 | Falkenhainer et al. | |
| 6,396,509 B1* | 5/2002 | Cheng | 715/706 |
| 7,822,781 B2* | 10/2010 | Greene et al. | 707/802 |
| 7,856,486 B2* | 12/2010 | Robertson et al. | 709/220 |
| 7,958,453 B1* | 6/2011 | Taing | 715/744 |
| 8,243,116 B2* | 8/2012 | Qvarfordt et al. | 348/14.01 |
| 2002/0064149 A1* | 5/2002 | Elliott et al. | 370/352 |
| 2004/0261013 A1* | 12/2004 | Wynn et al. | 715/511 |
| 2005/0280660 A1* | 12/2005 | Seo et al. | 345/629 |
| 2007/0162863 A1* | 7/2007 | Buhrke et al. | 715/757 |
| 2008/0030496 A1* | 2/2008 | Lee et al. | 345/418 |
| 2008/0263446 A1* | 10/2008 | Altberg et al. | 715/706 |
| 2009/0027337 A1* | 1/2009 | Hildreth | 345/158 |
| 2009/0051681 A1* | 2/2009 | Sharp et al. | 345/419 |
| 2009/0113066 A1* | 4/2009 | Van Wie et al. | 709/231 |
| 2010/0332998 A1* | 12/2010 | Sun et al. | 715/757 |
| 2011/0112971 A1* | 5/2011 | Wynn et al. | 705/301 |
| 2012/0059744 A1* | 3/2012 | Abecassis et al. | 705/30 |

OTHER PUBLICATIONS

L. Gamberini and A. Spagnolli, "On the Relationship Between Presence and Usability: a Situated, Action-Based Approach to Virtual Environments," Being There: Concepts, Effects and Measurement of User Presence in Synthetic Environments, IOS Press, 11 pages, 2003.
G. Wadley and N. Ducheneaut, "Virtual Barn-Raising": A Study of Collaborative Building in Second Life, 21 pages, publication pending.
Eva-Lotta Sallnäs, "Presence in Multimodal Interfaces," Interaction and Presentation Laboratory, NADA, 6 pages.
M. Meehan, B. Insko, M. Whitton, and F.P. Brooks, Jr., "Physiological Measures of Presence in Stressful Virtual Environments," ACM Transactions on Graphics, pp. 645-652, 21(3), Jul. 2002.

(Continued)

*Primary Examiner* — Steven Sax
(74) *Attorney, Agent, or Firm* — Hoffmann & Baron, LLP

(57) ABSTRACT

Embodiments described herein are directed to managing document interactions in a collaborative document area of a virtual world. Document interactions of avatars in the collaborative document area of the virtual world are captured by an interaction tool deployed in the collaborative document area. The document interactions are related to at least one document in the collaborative document area. The document interactions are associated with the at least one document based on a reference scheme applied to the collaborative document area by an interaction association unit.

21 Claims, 9 Drawing Sheets

(56) References Cited

OTHER PUBLICATIONS

M.M. Montoya, A.P. Massey, B. Samuel and N. Lockwood, "PVP: Measuring Perceived Virtual Presence in Collaborative Virtual Environments," MIS Quarterly, Special Issue on New Ventures in Virtual Worlds, 30 pages, Sep. 15, 2008.

http://www.exitreality.com/about.html, "About ExitReality—The Entire Web in 3D," ExitReality, 2 pages.

* cited by examiner

MANAGING DOCUMENT INTERACTIONS IN COLLABORATIVE DOCUMENT ENVIRONMENTS OF VIRTUAL WORLDS

BACKGROUND

1. Technical Field

The presently disclosed embodiments are directed to managing document interactions in a collaborative document environment of a virtual environment.

2. Brief Discussion of Related Art

Documents, as states of knowledge, play a significant role in enterprise collaboration. Traditional document management systems primarily support an individual user interacting with a collection of documents, such as content authoring, navigation/browsing, access control, tagging, versioning, etc. In the past several years, there has been a strong trend to embrace collaborative Web 2.0 technologies (e.g. wiki, blogs, social community, instant messaging (IM), voice over IP, video streaming) in document management systems to support some sort of synchronous or asynchronous collaboration in virtual workspaces.

However, these web 2.0 enabled collaborations are primarily centered on the evolution of the content (i.e. text, image, video, audio), and typically neglect some important aspects of human interaction (e.g. social and/or visual cues). For instance, remote participants in web conferencing or online learning may not be fully immersed in the experience and as a result, the participants can feel less engaged or less productive than if the participants were together in a conference room or a lecture hall. Furthermore, there is typically little support for direct social interactions among participants in existing document management systems, beyond instant messaging or voice communication. Although telepresence and video conferencing technologies are evolving rapidly, they typically do not fully address collaborations around content repositories or document content.

SUMMARY

According to aspects illustrated herein, there is provided a method for managing document interactions in a collaborative document area of a virtual world. The method includes capturing document interactions of avatars in the collaborative document area of the virtual world by an interaction tool deployed in the collaborative document area. The document interactions are related to at least one document in the collaborative document area. The method also includes associating the document interactions with the at least one document based on a reference scheme applied to the collaborative document area by an interaction association unit.

According to other aspects illustrated herein, there is provided a system for managing document interactions in a collaborative document area of a virtual world. The system includes a computer system having at least one computing device. The computer system is configured to capture document interactions of avatars in the collaborative document area of the virtual world. The document interactions are related to at least one document in the collaborative document area. The computer system is also configured to associate the document interactions with the at least one document based on a reference scheme applied to the collaborative document area.

According to further aspects illustrated herein, there is provided a computer readable medium that stores instructions executable by a computing system including at least one computing device, wherein execution of the instructions implements a method for managing document interactions in a collaborative document area of a virtual world. The method implemented upon execution of the instructions includes capturing document interactions of avatars in the collaborative document area of the virtual world by an interaction tool deployed in the collaborative document area. The document interactions are related to at least one document in the collaborative document area. The method implemented upon execution of the instructions also includes associating the document interactions with the at least one document based on a reference scheme applied to the collaborative document area by an interaction association unit.

DETAILED DESCRIPTION

Figure 1:
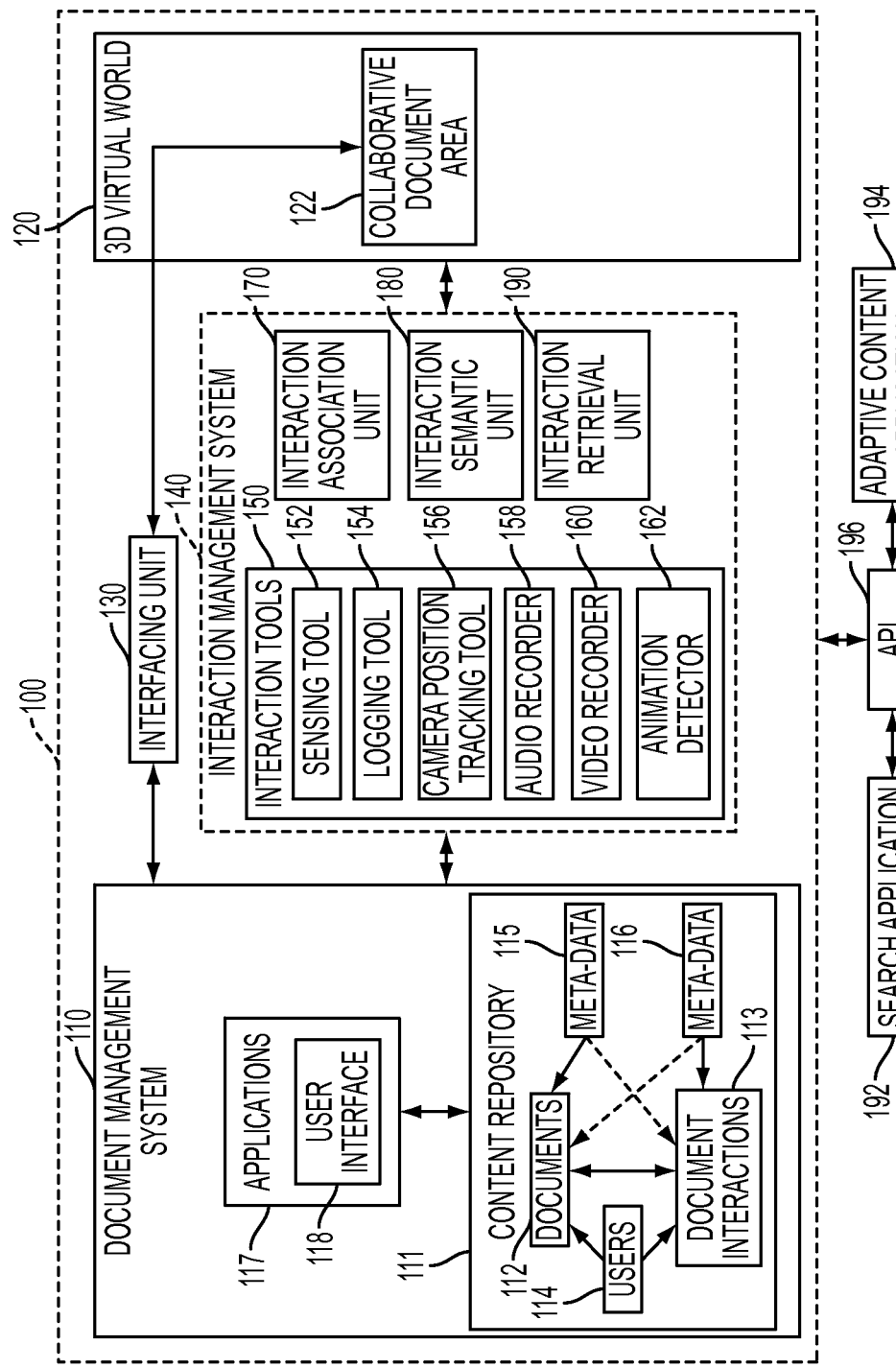
FIG. 1 is a block diagram illustrating an exemplary collaborative document environment.

Exemplary embodiments are directed to tracking, monitoring, capturing, and storing document interactions in a collaborative document area of a virtual world. These document interactions include interactions between avatars that represent users and documents as well as interactions among avatars within a well-defined document context. By tracking, monitoring, capturing, and storing these document interactions, exemplary embodiments can provide instant feedback to influence the users/avatars' behaviors and/or to enable the adaptive content. Further, document interactions can be stored in a content repository with the corresponding documents. The captured document interactions can be available to replay or review at a subsequent time. These persistent document interactions can also be used to provide additional social contexts to improve content search and navigability of a content repository in which the documents and document interactions are stored.

As used herein, "document interactions" refer to interactions in a collaborative document area with regard to specific documents (e.g., a document collection, a presentation slide or slides, a report or a page of a report, a web page or web pages, an image or a collection of images, audio or video, 3D model(s), and the like). The document interactions include interactions between avatars and documents, such as collaborative authoring, tagging, searching, and the like, and interactions among avatars within a defined document context, such as conversations, discussions, commentary, dialogue, and the like, around a particular document or group of documents.

As used herein, a "document management system" refers to a system for managing document storage, retrieval, modification, and the like. A document management system can include a content repository and one or more software applications for interfacing with the content repository, where a "content repository" is a storage device in which documents are stored.

As used herein, a "document" refers to computer file that contains information. Some examples of documents include word processing files, portable document files (PDFs), spreadsheet files, image files, video files, sound files, 3D model files, slide presentation files, and the like.

As used herein, an "interaction management system" is a software component implemented using at least one computing device to manage, track, capture, and store document interactions.

As used herein, an "interaction tool" refers to a software component configured to facilitate interactions between avatars and documents in a collaborative document area and amongst avatars.

As used herein, an "interaction association unit" refers to a software component that facilitates associations between document interactions and a particular document or group of documents using a "reference scheme", which refers to one or more techniques used to associate a document or group of documents with document interactions.

As used herein, an "interaction semantic unit" refers to a software component that implements a meta-data structure for a content repository based on a document interaction context using a semantic scheme. A "semantic scheme" is refers to one or more techniques for specifying a semantic context.

As used herein, "semantic context" refers to a purpose, intention, function, and the like, of a document based on a meaning of information contained in the documents and/or meta-data properties of the documents and/or meta-data properties of document interactions that are associated with the document. "Meta-data properties" refer to information about the documents and/or document interactions, such as, for example, a title, summary, description, creator/owner, timestamp, file type, date of creation, and the like. Document interactions can be associated with additional meta-data properties, such as to which document the document interaction is directed. Some examples of semantic contexts include presentations, lectures/class, projects, exhibits, training, seminars, and the like.

As used herein, an "interaction storage and retrieval unit" refers to a software component that facilitates storage and retrieval of document interactions and/or documents using a context sensitive scheme. A "context sensitive scheme" refers to one or more techniques for facilitating retrieval of documents and/or document interactions based on the context in which the document interaction was created. For example, by whom the document interaction was created, when the document interaction was created, for which document the document interaction was intended, and so on.

As used herein, "deploy" refers to implementing one or more instances of one or more software applications in a computer environment.

As used herein, "capture" refers to acquiring information, such as, for example, document interactions, for storing and/or making the information available to users.

As used herein, a "collaborative document area" refers to a shared virtual 3D space in a 3D virtual world, in which users represented as avatars can interact with each other as well as with documents contained in the collaborative document area.

As used herein, a "3D virtual world" refers to a computer simulated 3D environment in which users, represented as avatars, can interact.

As used herein, an "avatar" refers to a computer animation of the user in a 3D virtual world.

As used herein, a "cell" refers to a defined region in a collaborative document area having boundaries such that avatars located within boundaries are identified as being within the defined region.

As used herein, a "channel" refers to a designated identifier for one or more documents.

As used herein, "explicit" refers to a recitation, selection, indication, and the like, which clearly and unambiguously identifies something, such as, for example, a document in a collaborative document area.

As used herein, "transporting" and "teleporting" are used interchangeably and refer to moving, copying, or mapping an object or item, such as an avatar or documents from a first location, such as a first location in 3D world or a document management system, to a second location, such as a collaborative document area.

FIG. 1 is a block diagram illustrating an exemplary collaborative document environment 100 (hereinafter "environment 100") that includes a document management system 110, a three-dimensional (3D) virtual world environment 120 (hereinafter "3D virtual world 120"), an interfacing unit 130, and an interaction management system 140. The environment 100 can enhance a document review experience and allows users interact with documents as well as to collaborate with other users in an immersive, engaging, and social virtual environment. The environment 100 can be implemented to provide, for example, delivery media for existing document services (e.g. online conferencing/training/learning service, remote help-desk or field service), virtual document services (e.g. collaborative document search, collaborative document tagging), and the like.

The document management system 110 includes a content repository 111 that stores documents 112 and document interactions 113, and implements at least one software application 117 executed using a computing device to provide a user interface 118 to facilitate interaction between a user and the content repository 111. The document interactions 113 occur in the collaborative document area and can be stored in the content repository 111 by the interaction management system 140. The document management system 110 can control the organization, storage, retrieval, security, and integrity of documents 112 and document interactions 113 in the content repository 111. Some examples of software applications that can be enhanced to implement at least portions of document management systems include Sharepoint® from Microsoft Corporation, DocuShare® from Xerox Corporation, LotusNotes® from International Business Machines (IBM) Corporation, and the like.

The content repository 111 stores collections of documents 112 and document interactions 113, which can be accessed by users via the user interface 118 of the application 117. The collection of documents can be identified using a collection identifier. In some embodiments, the collection identifier can be a uniform resource identifier (URI), such as a uniform resource locator (URL) address. The collection of documents 112 in the content repository 111 can be structured to organize the documents 112 in predefined manner. The document management system 110 can enforce a logical structure of the content repository 111 and can allow one or more users 114 to store, access, retrieve, modify, and the like, documents 112 in the content repository 111. For example, the content repository 111 be implemented using a relational model, a hierarchical model, a network model, an object-oriented database model, an extensible mark-up language (XML) based database model, and/or the like, the implementation of which are well known to those skilled in the art.

The content repository 111 can include meta-data 115 to associate information about the documents 112 with the documents 112 in the content repository 112 and can include meta-data 116 to associate information about the document interactions 113 with the document interactions 113. Meta-data properties, such as a title of a document, summary of a document, description of a document, file type of a document, date of creation of a document, identity of the creator of a document, and the like, can be defined for the meta-data 115 associated with documents 112, and are referred to herein as "generic meta-data properties". The meta-data 116 associated with the document interactions 113 can include the generic meta-data properties and can also include meta-data properties specific to document interactions. For example, meta-data 116 can include when and where document interactions happen; who participated in the document interactions; the type or mode of the document interaction (e.g., voice, text, video, animation/expression/gestures); what precipitated the document interactions (e.g., document review, presentation, project meeting); and so on.

The documents 112 can be associated with corresponding document interactions 113 using a reference scheme implemented by the interaction management system 140. This can allow a user to retrieve documents and corresponding document interactions from the content repository 111 for review in a collaborative document area. The meta-data 115 can be cross-referenced with the document interactions 113 and the meta-data 116 can be cross referenced with the documents 112. The meta-data 115 and 116 can facilitate searching or navigating of the content repository 111 and/or can be used to customize a corresponding collaborative document area. A user can search for documents of document interactions using the generic meta-data properties, the document interaction specific meta-data properties, and/or a combination of both. As one example, a user may wish to retrieve documents associated with document interactions of a particular user or group of users to review document in view of the document interactions generated in response to the activities of the user or group of users in the collaborative document area.

The user interface 118 can include a graphical user interface, a command line interface, or other user interfaces to allow a user to access, search, retrieve, modify, organize, and the like, documents in the content repository 111. Access to the documents 114 in the content repository 111 can be predicated on user authorization such that once an identification of the user has been established by logging in, the user can access all, some, or none of the documents 112. The user interface 118 can include a teleport button, the activation of which can initiate a transfer of the user and a collection of documents 112 currently accessed by the user to a collaborative document area 122 in the 3D virtual world 120.

The document management system 110 can implement a security policy to restrict access of documents within the content repository 111. For example, access to the documents in the content repository 111 can require users to login in to the document management system 110 using a username and password. The security policy can assign security levels to some, all, or none of the documents 112 in the content repository 111 such that only user meeting the specified security levels can access the documents 112.

The 3D virtual world 120 includes the collaborative document area 122 and is a computer simulated environment in which users, represented as avatars, can interact. Users of the 3D virtual world can experience a telepresence, which allows the user to feel as if they are actual present in the 3D virtual world 120 and/or that they have a physical effect at a location other than their true physical location. Avatars representing users can facilitate a broad range of communications such as text, graphics, visual gestures, social cues, sounds, animations, and the like. Areas in the 3D virtual world 120 can appear similar to the real world and/or can depict fantasy worlds. Rules can be applied in the 3D virtual world 120 to model real world attributes, such as gravity, topography, locomotion, real-time actions, and communication. Some examples of 3D virtual worlds can include Second Life from Linden Research, Inc. (Linden Labs®), Project Wonderland from Sun Microsystems, Inc., Qwaq Forums from Qwaq, Inc, and the like.

The collaborative document area 122 can be generated in the 3D virtual world 120 and can be associated with the content repository 111, a group of documents 112 in the content repository 111, multiple content repositories, a group of documents 112 that are distributed among multiple content repositories, and the like. The location of the collaborative document area 122 can be identified using an identifier. The identifier can be assigned by the virtual world 120 or can be generated by the creator of the collaborative document area 122. For example, when the virtual world is implemented using Second Life, the unique identifier can be a Second Life Uniform Resource Locator (SLURL) address. Avatars representing users can be teleported to the collaborative document area 122 upon entering the identifier corresponding to the collaborative document area 122 or can be teleported using a collection identifier that identifies the underlying collection of documents in the content repository.

The interfacing unit 130 allows users to transition between the document management system 110 and the collaborative document area 122 in the 3D virtual world 120 and/or between a first location in the 3D virtual world 120 and the collaborative document area 122 in the 3D virtual world 120. The interfacing unit can also facilitate customization of the collaborative document area 122, for example, customizing the scene, layout, size, and the like of the collaborative document area 122 and can implement access management for the documents in the collaborative document area 122. One exemplary interfacing unit is described in more detail in copending U.S. patent application Ser. No. 12/492,533, entitled "Collaborative Document Environments In Three-Dimensional Virtual Worlds" and filed on even date herewith, the disclosure of which is incorporated herein by reference in its entirety.

The interaction management system 140 includes interaction tools 150, an interaction association unit 170, an interaction semantic unit 180, and an interaction retrieval unit 190. Using unique programmatic capabilities of the 3D virtual world, the interaction management system 140 can explicitly track, monitor, and capture document interactions occurring around content of documents. The interaction management system 140 enhances the shared collaborative document area 122 using multi-modal document interactions to facilitate compelling social experiences amongst a community of users. The interaction management system 140 extends the meta-data structure of the content repository 112 with semantic-rich interaction contexts of the document interactions so that the persistent document interactions can enable, for example, experiences-mediated content search and navigation for users of the content repository 112. For example, the interaction management system 140 can allow users to retrieve documents that attracted the most document interactions, that received document interactions from a specific user or users, that received negative or positive reactions, and the like.

The interaction tools 150 include a sensing tool 152, a logging tool 154, a camera position tracking tool 156, an audio recorder 158, a video recorder 160, and an animation detector 162. The interaction tools 150 are available to be deployed to track and monitor the multi-modal document interactions in the collaborative document area 122.

The sensing tool 152 senses an avatar name, avatar ID, and avatar position over time. The sensing tool captures an avatar's presence in the collaborative document area 122, as well as where each avatar travels or visits in the collaborative document area 122, and the like. Based on this sensing, a graphical representation of the traffic data in the collaborative document area can be constructed, which is referred to herein as a "traffic heat map". The document interactions captured by the sensing tool 152 can be made available to other avatars in the collaborative document area and/or can be stored for subsequent use and/or processing.

The logging tool 154 logs text-based messages, such as chat messages, instant messages, comments, and the like, sent among avatars, or submitting for documents, by capturing what has been written in text by participating avatars. For example, two users represented as avatars in the collaborative document area 122 can communicate with each other using text-based messages. The users can have a dialog regarding, for example, one or more documents in the collaborative document area 122. The document interactions captured by the logging tool 154 can be available for immediate use by other avatars in the collaborative document area and/or can be stored for subsequent use and/or processing.

The camera position tracking tool 156 tracks camera positions associated avatars. The camera position associated with an avatar indicates where the avatar is looking, regardless the avatar's location in the collaborative document area 122. The camera position can indicate on what the avatar's attention is focused. As the avatar's camera position changes while the avatar is in the collaboration document area 122, the camera position tracking tool 156 can capture what the avatar paid attention to and for how long the avatar paid attention. Based on the tracked camera positions of an avatar, a graphical representation of which positions in the collaborative document area have been viewed by avatars can be constructed, which is referred to herein as an "attention heat map". The document interactions captured by the camera position tracking tool 156 can be made available for immediate use by other avatars in the collaborative document area 122 and/or can be stored for subsequent use and/or processing.

The audio recorder 158 records voice communications in the collaborative document area 122. The voice communications can be directed to one or more avatars in the collaborative document area 122 and/or to one or more documents in the collaborative document area 122. The voice communications can be recorded as voice files that can be made immediately available to other avatars in the collaborative document area 122 and/or can be stored for subsequent use and/or processing. The recorded voice files can be further analyzed and disseminated based on voice recognition technologies.

The video recorder tool 160 records video around a designated location, such as around one or more documents. The video can be recorded as video files that can be used to identify avatars that entered into the designated location. The video files can be associated with other document interactions to illustrate a social experience that occurred at a point in time in the collaborative document area. For example, the recorded video files can be synchronized with recorded audio files. In this example, the recorded video files can be viewed while listening to the recorded audio files to give the view a sense of the social interactions that occurred with respect to a particular document or group of documents. The document interactions captured using the video recorder tool 160 can be made immediately available to other avatars in the collaborative document area 122 and/or can be stored for subsequent use and/or processing. The recorded video files can be further analyzed and disseminated based on motion image recognition technologies.

The animation detection tool 162 detects gestures, expressions, and other animations of avatars in the collaborative document area 122. Moods, such as happy, sad, bored, excited, and the like, and/or opinions, such as agreed, disagreed, indifferent, and the like, can be expressed by avatars via animation scripts. The animation scripts can manipulate an avatar's facial expressions and/or body movements to depict the mood or opinion of the avatar. For example, the animation scripts can cause an avatar to nod or shake its head, smile, cry, jump up, raise its hand, shrug, and the like. The animation detection tool can detect when an animation script is implemented by a user and can determine which animation script has been implemented.

In some embodiments, a small set of common gestures or expressions (e.g. nod/shake head, smile/cry, jump up, raise hand, and the like) can be predefined using a set of rules corresponding to the common gestures or expressions and a set mood/opinion terms. For example, if an avatar "shakes head", then this avatar "disagreed"; if an avatar "smiles", then this avatar is "happy". As soon as the avatar animation is detected, a message can be logged as a mood/opinion feedback according to these pre-defined rules. In other words, whenever an avatar "shake head" animation script is run, the animations script is detected and a message indicating the "avatar disagreed" can be logged. The gestures and/or moods using the animation scripts which can be invoked via a graphical user interface (GUI) message/command. This animation detection tool captures social and visual cues associated with document interactions that would otherwise be lost. Those skilled in the art will recognize many other motion detection approaches can be used to determine the mood/opinion of an avatar and that the present example is only illustrative of one approach that can be implemented.

The tagging tool 164 allows users to leave comments or messages for a document or group of documents. The avatar can affix tag identifiers to a document to indicate a message or comment has been left. The tag identifier can be selected by avatars in the collaborative document area to view the message or comment corresponding to the tag identifier. The tagging tool can also provide a user interface (UI) that includes a textual box or note-card drop box next to a document. The tagging tool 164 allows users to submit comments and/or tags for particular documents in the collaborative document area 122. The comments or tags can be reviewed by other avatars in the collaborative document area 122 and/or can be captured and stored for subsequent use and/or processing.

The interaction tools 150 can function within pre-set ranges defined by 3D cells or spaces in the collaborative document area 122. An instance of the interaction tools 150 can be deployed in each cell. For example, each document in the collaborative document area 122 can be in a different cell so that each document is associated with an instance of the interaction tools 150 or cells can include groups of documents and the groups of documents can each be associated with an instance of the interaction tools 150.

The interaction association unit 170 provides a reference scheme to determine associations between document interactions and documents for which the document interactions correspond (e.g. what document or group of documents a particular discussion is referencing, for which document or group of document a comment is specifically made), which is referred to herein as a "mutual reference". The interactions association unit 170 can interface with the interaction tools 150 to facilitate mutual referencing so that document interactions are associated with documents for which the document interactions occurred. This allows the interaction management system 140 to provide meaning to document interactions, for example, in the context of document review in the collaborative document area 122.

In some embodiments, the reference scheme implemented by the interaction association unit 170 can deploy a set of the interaction tools 150 in each defined 3D cell so that the size of a 3D cell is a pre-set function range for interaction tools 150, and the interactions captured by the interaction tools 150 are associated with documents in the 3D space, if not explicitly stated otherwise. Using this approach, the granularity of mutual referencing of the document interactions can be controlled by the number of documents encompassed by the 3D cell so that the document interaction can be attributed to each document in the 3D cell without distinction or to which document in the 3D cell the document interaction relates.

In some embodiments, the reference scheme implemented by the interaction association unit 170 can assign a unique chat messaging channel for specified document(s). Textual conversations captured on the channel are associated with the specified document(s). Using this approach allows users represented by avatars to explicitly select a messaging channel associated with a particular document or group of documents for which they wish to comment.

In some embodiments, the reference scheme implemented by the interaction association unit 170 can require each avatar explicitly mention, select, highlight, or other identify the document(s) to which their document interactions are directed. In some embodiments, this can be achieved by using a GUI command or other selection technique before the avatar engages in document interactions for a particular document. Otherwise, the document interactions can be deemed to refer to all documents in the collaborative document area 122. This approach facilitates mutual referencing by allowing users to explicitly control the association of their document interaction with particular documents in the collaborative document area 122.

In some embodiments, the reference scheme implemented by the interaction association unit 170 can use a physical proximity of an avatar to one or more documents (i.e. a distance from the avatar to a document) to determine which of the documents are being referenced by the document interactions. For example, captured document interactions can be associated with one or more documents that are closest to the avatar when the document interactions occur. This approach allows the interaction management system 140 to automatically monitor, track, and capture mutual referenced document interactions in the background as avatars move through the collaborative document area 122.

The interaction association unit 170 can implement one or more reference schemes in combination or independently to associate document interactions with a corresponding document or group of documents. For example, the interaction association unit 170 can implement a cell encompassing a group of documents and can include a document selection button for each document in the group. In this example, document interactions occurring within the cell can be associated with a particular document if the user has selected the document selection button. Otherwise, the document interactions can be associated with all of the documents in the group encompassed by the cell. Those skilled in the art will recognize that the reference schemes described herein are illustrative and that other reference scheme can be implemented to associate document interactions with a particular document or a group of documents.

The interaction semantic unit 180 provides an interaction semantic scheme that extends the meta-data structure of the content repository 112 based on the document interaction context, such as when and where document interactions happen; who participates; what has been said, discussed, or written; how participants feel; and so on. The semantic attributes of the document interactions can provide a sense of social experiences or social life. Through this semantic scheme, users can tell not only what is in a document, who create/update it at when, but also to whom the document has been presented and exposed, what has been said or expressed about the document. The document interactions can also be explicitly stored or persistent in the content repository 111 according to this semantic scheme. Furthermore, the semantic scheme can be used to selectively retrieve or replay persistent interactions in the collaborative document area 122, and also as additional search or navigation contexts for repository users.

The interaction storage and retrieval unit 190 provides a context sensitive scheme for document interaction retrieval that allows the persistent interactions to be selectively retrieved or replayed in the collaborative document area based on user/avatar specific choices. Using the programmatic flexibility in the 3D virtual world, the persistent document interactions can be retrieved or re-played based on a particular document reference (e.g., document name, document title, page number of a document, image name), or a specific participant name (e.g., what this participant has done or said or viewed, and in what way), or the hot-spot (e.g., where have the most participants visited, where have most of the document interactions occurred), and the like.

The document interactions captured by the interaction management system 140 can be stored in the content repository 111. The document interactions can be stored in the same manner as documents are stored in the content repository 111. The stored or persistent document interactions inherit generic properties from the meta-data structure of the content repository 111 (i.e. a unique identity, a title, a summary or brief description and links). In addition to the generic properties, additional meta-data attributes can be added to the semantic scheme of persistent document interactions. The additional meta-data attributes can include a participating avatar names and avatar IDs, a trail map for participating avatars, a traffic heat map indicating a total number of participants or visitors, an attention heat map indicating what participants viewed or paid attention to, link attributes to the document interaction files (e.g. comments, discussions and feedbacks in textual, audio, video), link attributes to the documents that correspond to the document interactions, and the like.

The persistent document interactions can be stored, organized, and retrieved using this extensive semantic meta-data scheme. Furthermore, the semantic scheme of document interactions can be provided as additional social contexts for repository contents as well. The interaction management system 140 enables efficient content search and navigation in the repository.

The collaborative document environment 100, or components thereof, can interface with other applications, such as a content search application 192 or an adaptive content application 194 via a application program interface (API) 196. The content search application 192 can allow user to search the content repository using meta-data properties associated with the document interactions. Document interactions encompass content (e.g., one or more documents) and social experiences (e.g., collaboration between avatars and/or interactions between avatars and documents). Document interactions serve as additional social contexts for the documents. For example, a document may be presented in a series of document reviews in a collaborative document area during the document's lifecycle. The document interactions captured by the interaction management system during these reviews can provide information beyond the content of the document, such as who the presenters are, to whom the document has been presented, what feedback is gathered and by whom, and the like.

This information provides a meaningful context beyond the generic meta-data properties (e.g., author, keywords, versions, and the like). The interaction management system can enable a paradigm shift for information retrieval from the content-driven to a combination of content and social experience driven retrieval. Similarly, repository navigation schemes can be extended since the contents can be organized or structured based on their social experiences using the document interactions. For example, a user can search for content that caught most attention from participants in the collaborative document area, or retrieve the contents that have been visited a specific user at a specific event, such as a scheduled document review in the collaborative document area.

The adaptive content application 194 can use the document interactions to generate collaborative document areas that allow users to relive events, such as a project meeting be incorporating the document interactions into the collaborative document area with the documents and providing users with the heat maps generated in response to the document interactions that occurred at the event. This provides a user, who wish to relive or replay an event, with a social context while reviewing the document so that the user's review of the documents can incorporate discussions, comments, or other document interactions made by other users that have previously viewed the documents.

Although the search application 192 and the adaptive content application 194 have been illustrated as interfacing with the collaborative document environment 100, those skilled in the art will recognize that the search application and/or adaptive content application can be integrated into the collaborative document environment. For example, the search application 192 and the adaptive content application 194 can be included in the interaction management system 140.

Figure 2:
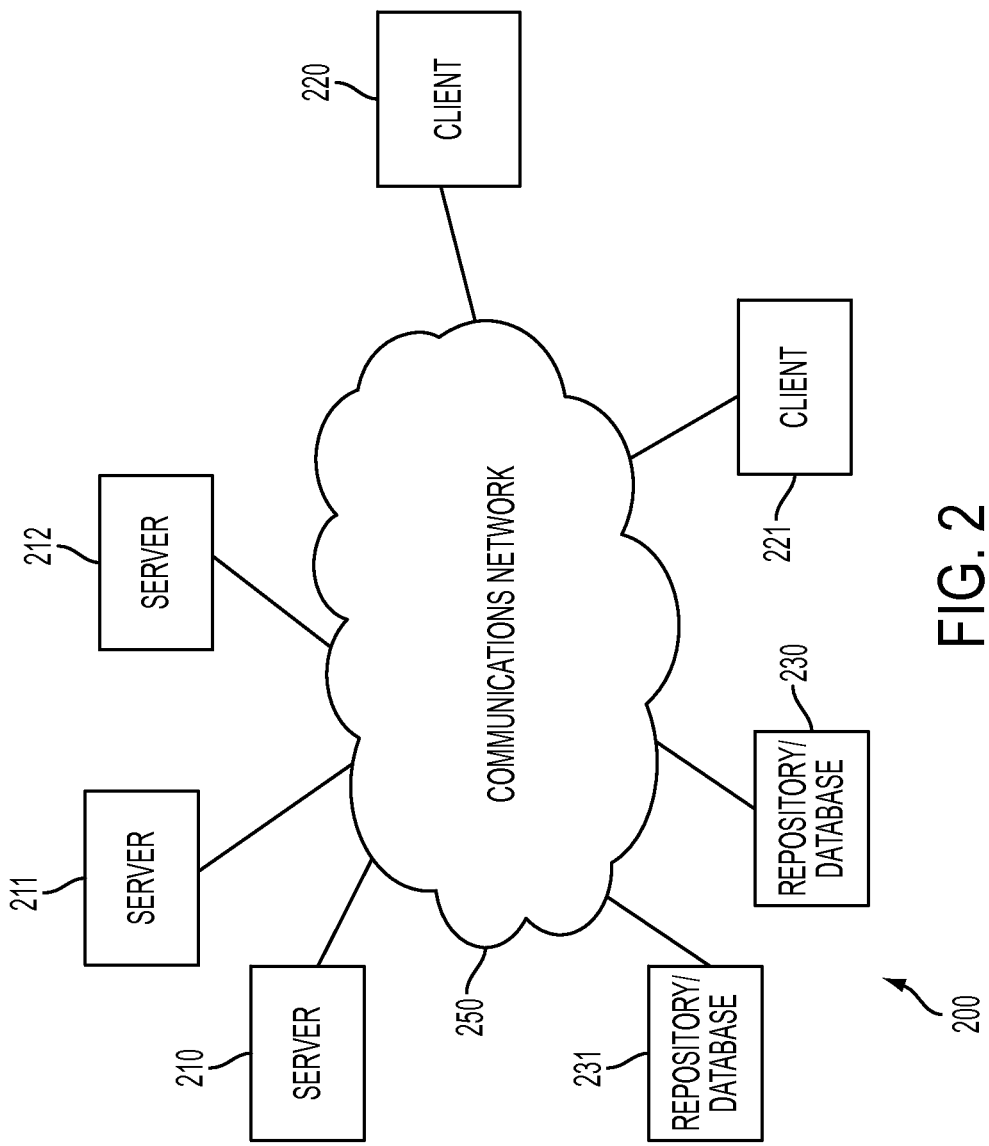
FIG. 2 is an exemplary computing system configured to implement embodiments of the collaborative document environment.

FIG. 2 is an exemplary computing system 200 configured to implement embodiments of the environment 100. The computing system 200 includes one or more servers 210-213 coupled to clients 220-223, via a communication network 250, which can be any network over which information can be transmitted between devices communicatively coupled to the network. For example, the communication network can be the Internet, Intranet, virtual private network (VPN), Local Area Network (LAN), Wide Area Network (WAN), and the like. The computing system 200 can include repositories or database devices 230-233 (hereinafter "database devices 230-233"), which can be coupled to the servers 210-213, as well as to clients 220-223, via the communications network 250. The servers 210-213, clients 220-223, and database devices 230-233 can be implemented using computing devices.

The servers 210-213, clients 220-223, and/or repository devices 230-233 can store information, such as documents, content repositories, meta-data, user names, passwords, shared collaborative document areas, document interactions, and the like. In some embodiments, the interfacing unit 130 and/or the interaction management system 140 can be distributed among the servers 210/220, clients 230/240, and/or database devices 230-233 such that one or more components of the interfacing unit 130 and/or interaction management system 140, or portions thereof, can be implemented by a different device (e.g. clients, servers, databases) in the communication network 250.

Figure 3:
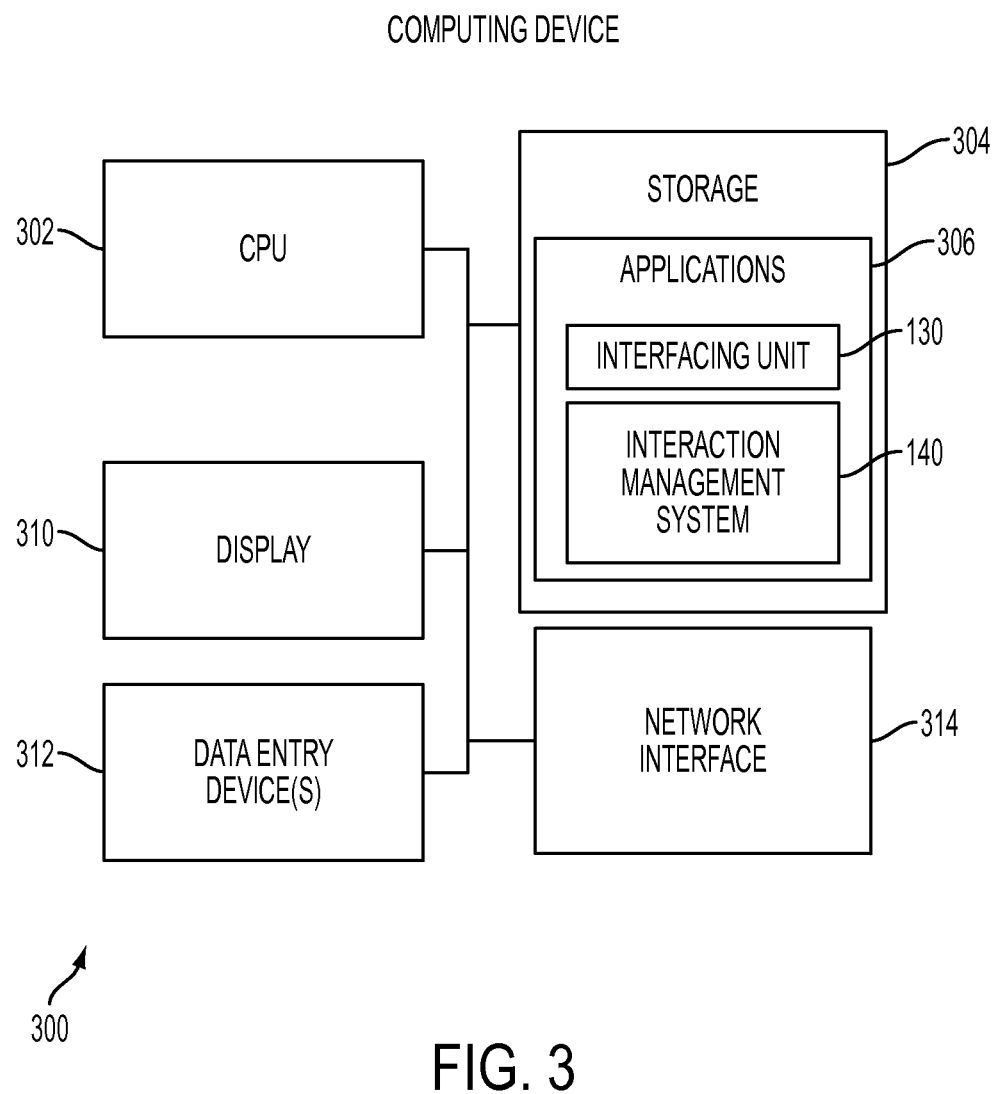
FIG. 3 is a block diagram of an exemplary computing device configured to implement embodiments of the collaborative document environment.

FIG. 3 is a block diagram of an exemplary computing device 300 configured to implement embodiments of the interfacing unit 130 and/or the interaction management system 140. The computing device 300 can be a mainframe, personal computer (PC), laptop computer, workstation, handheld device, such as a portable digital assistant (PDA), and the like. In the illustrated embodiment, the computing device 300 includes a central processing unit (CPU) 302 and can include storage 304. The computing device 300 can further include a display device 310 and data entry device(s) 312, such as a keyboard, touch screen, and/or mouse. The display device 310 enables the computing device 300 to communicate with a user through a visual display.

The storage 304 stores data and instructions and can be implemented using technologies, such as a floppy drive, hard drive, tape drive, Flash drive, optical drive, read only memory (ROM), random access memory (RAM), and the like. Applications 306, such as the interfacing unit 130 and/or the interaction management system 140, or portions thereof, can be resident in the storage 304. The applications 306 can include instructions for implementing embodiments of the interfacing unit 130 and/or the interaction management system 140. The storage 304 can be local or remote to the computing device 300. The computing device 300 includes a network interface 314 for communicating with a network, such as the communication network 350 of FIG. 2.

The CPU 302 operates to run the applications 306 in storage 304 by executing instructions therein and storing data resulting from the executed instructions, which may be presented to a user via the display 310 or by other mechanisms known to those skilled in the art, such a print out from a printer.

Figure 4:
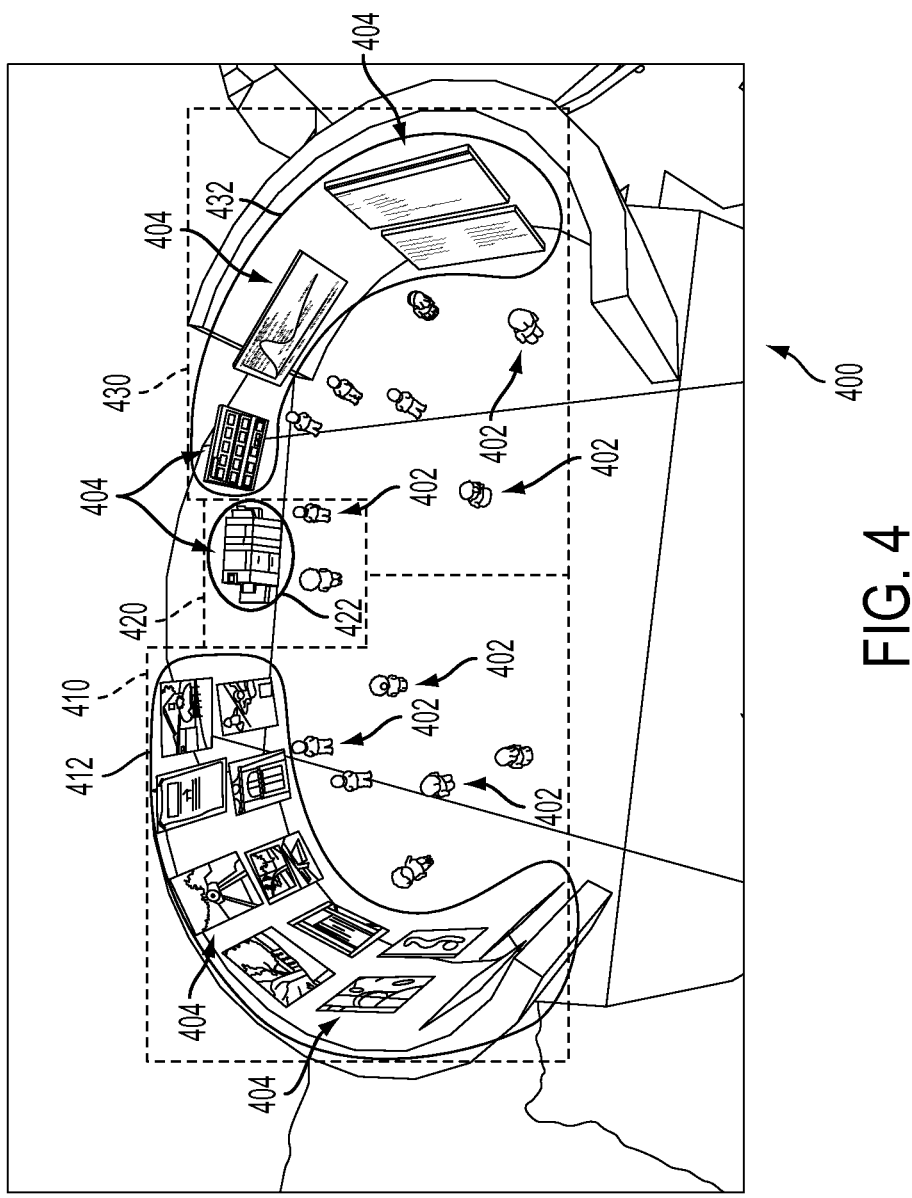
FIG. 4 is an exemplary illustration of a collaborative document area in which document interactions are captured.

FIG. 4 illustrates an exemplary collaborative document area 400 in which avatars 402, representing users, can interact with each other as well as with a collection of documents 404. The collection of documents 404 can be transported from the document management system to the collaborative document area 400 using the interfacing unit 130. The documents 404 can be clustered based on their semantic context, which can be determined using meta-data properties associated with the documents 404, so that document containing related information can be located in proximity with each other. In the present example, the collaborative document area 400 is divided into cells 410, 420, and 430 by the interaction association unit based on the meta-data properties. Each of the cells 410, 420, and 430 encompass at least one of the documents 404. For example, the cell 410 encompasses a group 412 of the documents 404, the cell 420 encompasses a group 422 of the documents 404, and the cell 430 encompasses a group 432 of the documents 404. Those skilled in the art will recognize that the number of documents encompassed by the cells can vary.

The cells 410, 420, and 430 define regions in which document interactions are associated with the group of documents encompassed by the cells 410, 420, and 430. For example, document interactions occurring in the cell 410 are associated with the group 412 of documents encompassed by the cell 410, document interactions occurring in the cell 420 are associated with the group 422 of documents encompassed by the cell 420, document interactions occurring in the cell 430 are associated with the group 432 of documents encompassed by the cell 430. The interaction management system can capture and store the document interactions in the content repository for future use and can assign meta-data properties to the document interactions and/or can assign meta-data properties to the documents for which the document interaction correspond.

In some embodiments, the cells 410, 420, and 430 can be displayed in the collaborative document area so that the user can determine in which of the cells 410, 420, or 430, the avatar representing the user is located. In other embodiments, the cells 410, 420, and 430 are not displayed to the user.

Figure 5:
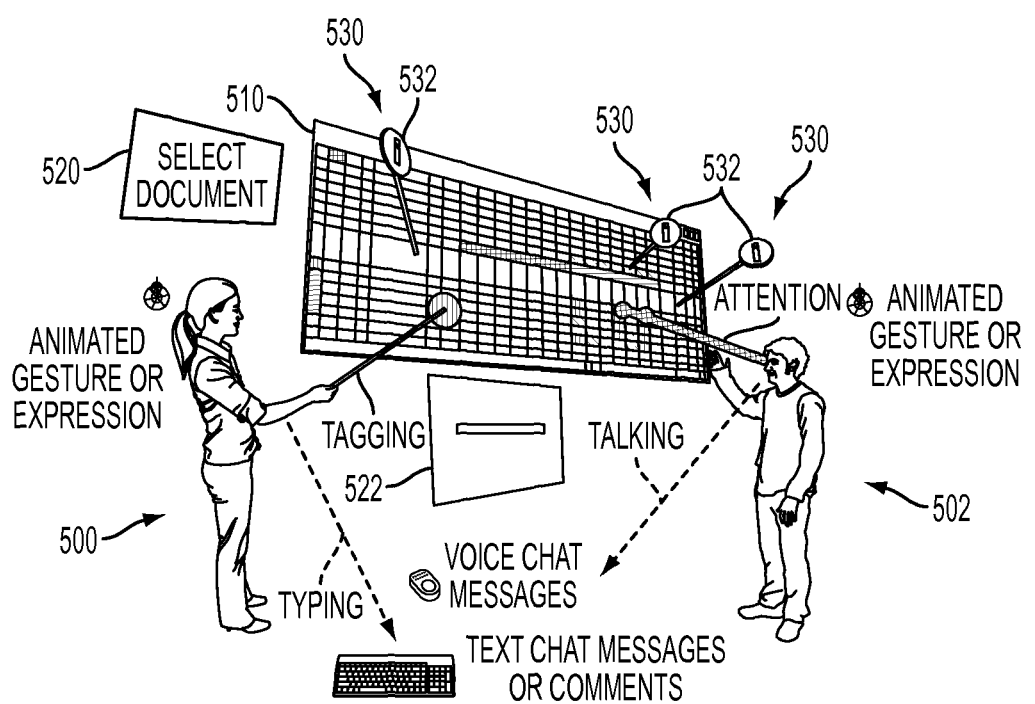
FIG. 5 is an exemplary implementation of document interactions.

FIG. 5 illustrates exemplary multi-modal document interactions in a collaborative document area. Using the interaction management system, avatars 500 and 502 can interact with each other as well as with a document 510. Multi-modal document interactions, such as text-based messages, voice-based messages, animations scripts including expression and gestures, tagging, avatar's attention, and the like, can be associated with the documents based on a reference scheme implemented by the interaction association unit. For example, the document interactions can be associated with a document or a group of documents based on a cell defining a region that encompasses the document or group of documents, an explicit mention or selection of the documents, and so on.

The present example includes a "select document" button 520 and a message slot 522 to associated document interactions with the document 510. The button 520 can be selected by a user represented by the avatar 500 and/or a user represented by the avatar 502. For example, the user represented by the avatar 500 can select the button 520, after which document interactions associated with the avatar 500 are associated with the document 510. The document interactions can be captured and stored in the content repository and meta-data properties can be associated with the document interactions and/or meta-data properties can be associated with the document 510 based on the document interactions.

The message slot 522 is associated with the document 510 and allows the user to submit text-based messages to be associated with the document 510. The user can enter the text-based message, which can be captured and stored by the interaction management system in the content repository. Meta-data properties can be associated with the stored document interactions and/or meta-data properties corresponding to the document interactions can be associated with the document 510.

Likewise, the users represented by the avatars 500 and 502 can place tags 530 at particular points on the document. The tags can include text-based messages, audio-based message, video-based messages, and the like which can be depicted on the document 510 using tag identifiers 532. User viewing the document 510 can select one of the tag identifiers 532 to view the information contained by the tag. The tags can be captured and saved in the content repository and meta-data properties can be associated with the document interactions and/or meta-data properties can be associated with the document 510 based on the content of the document interactions (e.g., the tags).

Figure 6:
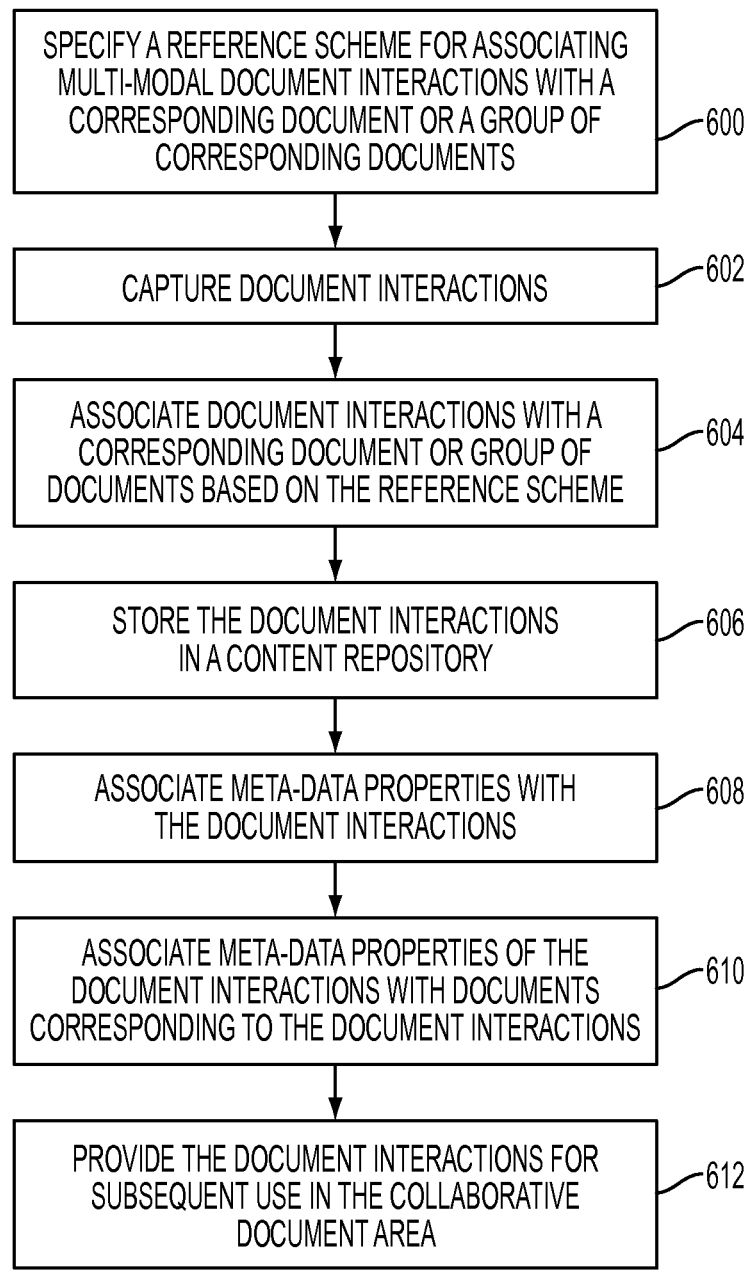
FIG. 6 is a flowchart illustrating capturing document interactions and associating the document interactions with a particular document or a group of documents.

FIG. 6 is a flowchart illustrating an exemplary association of document interactions with a particular document or group of documents. An avatar can enter a collaborative document area to interact with documents and other avatars. A reference scheme is specified for associating multi-modal document interactions with a corresponding document or a group of corresponding documents to form mutual references (600). The reference scheme can include cells encompassing documents, explicit mention or selection of a document or group of documents, tagging a particular document, submitting messages using a message slot associated with a document or group of documents, sensing an avatar's attention as being focused on a particular document or portion of the particular document, and the like.

Document interactions are captured by the interaction management system (602) and are associated with a corresponding document or group of documents based on the reference scheme by the interaction management system (604). Document interactions can include text-based messages, voice-based messages, document tags, animations including gestures and/or expressions, a focus of an avatar's attention based on a camera position associated with the avatar, and so on. The document interactions are stored in a content repository (606) and meta-data properties are associated with the document interactions (608). Meta-data properties are also associated with documents corresponding to the document interactions (610). The document interactions can be made available for subsequent use in the collaborative document area (612).

Figure 7:
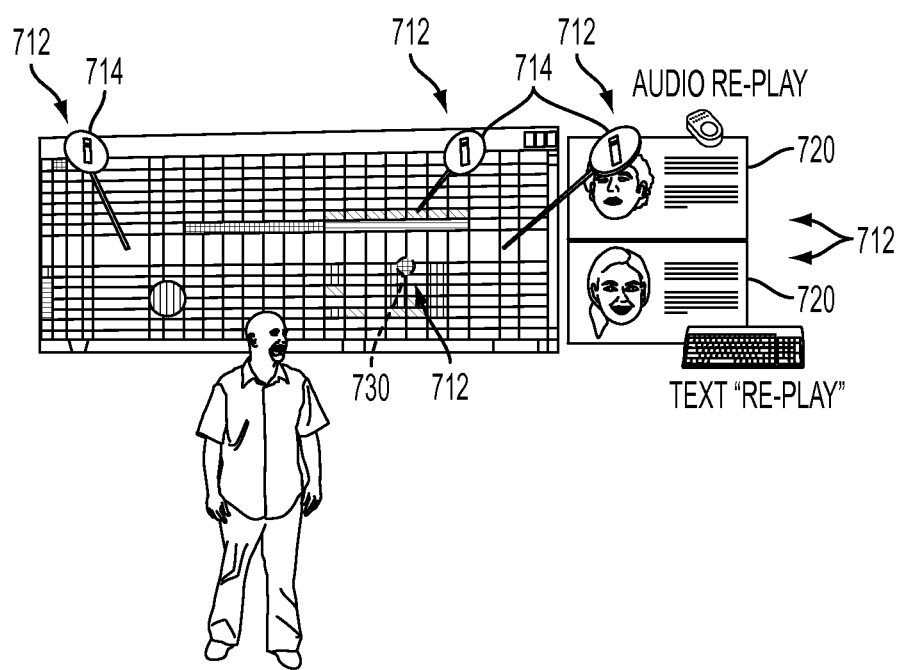
FIG. 7 is an exemplary illustration of replaying document interactions.

FIG. 7 is an exemplary illustration of re-experiencing, replaying, or reviewing documents interactions that have been captured by the interaction management system. Avatars in the collaborative document area, such as an avatar 700 representing a user, can be controlled to view a document 710. The document 710 can be associated with document interactions 712 resulting from other avatars that viewed the document 710 before the avatar 700.

In the present example, the document interactions 712 are displayed on or about the document 710. The user can select the document interactions 712 to review. For example, the user can select a document tag identifier 714, provided by a user that previously viewed the document 710, to display comments regarding the tagged section of the document 710. Likewise, the user can review text-based messages and/or audio based messages by selecting message identifiers 720 being displayed about the document 710. Attention hotspots 730 can be displayed on the document 710 to indicate areas of the document 710 on which other avatars that previously viewed the document focused.

The document interactions captured by the interaction management system can be stored in the content repository for subsequent review. The document 710 and the document interactions 712 can be retrieved from the content repository by a user. The document interaction 712 can allow the user to replay the social experiences represented by the document interactions 712. For example, a user may wish to view a document, such as document 710, in the collaborative document area. The user can retrieve the document 710 and when the document 710 is displayed in the collaborative document area, the document interactions 712 are also displayed so that the avatar can review the document 710 and the corresponding document interactions 712.

Figure 8:
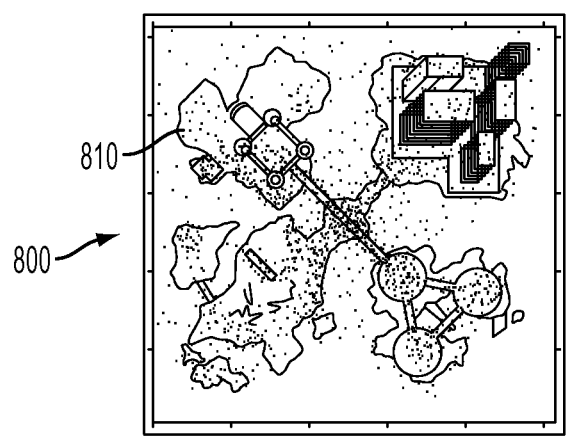
FIG. 8 is an exemplary heat map that can be generated based on captured document interactions.

FIG. 8 is an exemplary heat map 800 that can be generated based on captured document interactions. In the present example, the heat map 800 can represent a traffic heat map that indicates locations in a collaborative document area 810 that avatars visited. This allows a user to determine which of the documents in the collaborative document area attracted the most viewers, as well as any viewing patterns that may exist. The heat map can use colors to identify a degree of traffic at each location. For example, red spots on the heat indicate heavy traffic and blue spots indicate light traffic areas. While the present example is directed to a traffic heat map, those skilled in the art will recognize that other heat maps can be implemented, such as, for example, attention heat maps.

Figure 9:
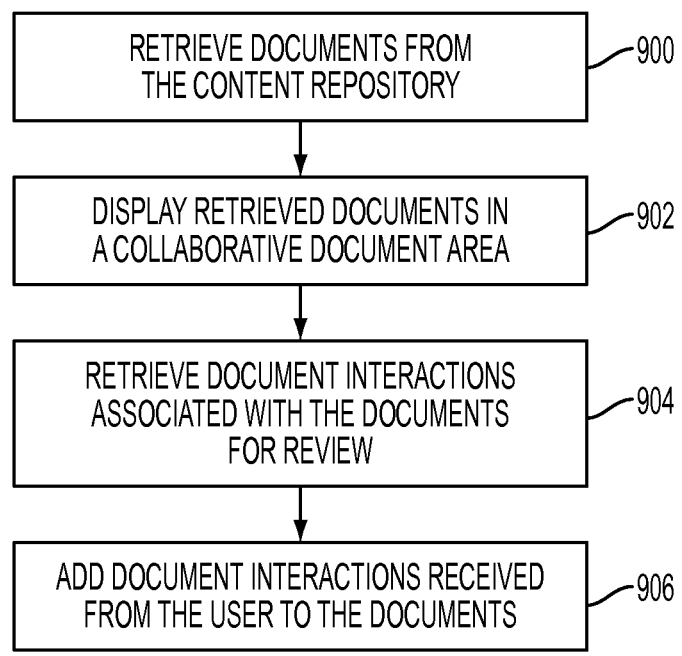
FIG. 9 is a flowchart illustrating an exemplary retrieval and replay of document interactions associated with a document.

FIG. 9 is a flowchart illustrating an exemplary review or replay of documents and corresponding document interactions. An avatar may wish to review documents and document interactions stored in the content repository. The user can perform a search or otherwise retrieve documents and/or document interactions from the content repository (900). For example, the user may wish to retrieve documents based on meta-data properties pertaining to a particular project, creator, file type, type of document interactions associated with the document, an identity of a user who provided document interactions, a date of the document interactions, and the like. The documents that are retrieved can be displayed in a collaborative document area (902). The document interactions associated with the documents can be retrieved and made available in the collaborative document area for review by the user (904). The user can review the documents and corresponding document interactions and can add document interactions, which can be captured by the interaction management system and stored in the content repository (906).

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for managing document interactions in a collaborative document area of a virtual world comprising:
displaying one or more documents in the collaborative document area, the collaborative document area being a shared virtual space in the virtual world;
capturing document interactions of one or more avatars, an avatar being a representation of a user in the virtual world, with the one or more displayed documents in the collaborative document area of the virtual world using an interaction tool deployed in the collaborative document area using one or more computing devices, the document interactions comprising focusing of the avatar's attention upon, gestures and visual expression, the document interactions being related to at least one displayed document in the collaborative document area;
associating the document interactions with the at least one document based on a reference scheme applied to the collaborative document area by an interaction association unit using the one or more computing devices; and
storing the document interactions with the documents in a content repository, the document interactions being associated with one or more meta-data properties to facilitate searching and navigating of the content repository with respect to the document interactions.

2. The method of claim 1, wherein associating the document interactions with the at least one document comprises:
defining at least one cell in the collaborative document area that encompasses the at least one document;
deploying the interaction tool for capturing document interactions in the at least one cell that is defined; and
associating document interactions captured by the interaction tools with the at least one of the documents encompassed by the cell.

3. The method of claim 1, wherein associating the document interactions with the at least one document comprises requiring explicit identification of the at least one document to which the document interactions are directed to control an association of the document interactions with the at least one document.

4. The method of claim 1, wherein associating the document interactions with the at least one document comprises associating the document interactions with the one or more documents based on a proximity of an avatar to the at least one document.

5. The method of claim 1, further comprising retrieving at least one of the documents based on a meta-data property assigned to at least one of the document interactions.

6. The method of claim 1, further comprising displaying the document interactions with the at least one document in the collaborative document area for simultaneous review.

7. The method of claim 1, wherein associating the document interactions with the at least one document comprises assigning a unique channel to an interaction tool for capturing document interactions, the unique channel corresponding to the at least one document.

8. A system for managing document interactions in a collaborative document area of a virtual world comprising:
a computer system having one or more computing devices, the computing system configured to:
display one or more documents in the collaborative document area, the collaborative document area being a shared virtual space in the virtual world;
capture document interactions of one or more avatars, an avatar being a representation of a user in the virtual world, with the one or more displayed documents in the collaborative document area of the virtual world, the computing system being configured to capture the document interactions focusing of the avatar's attention upon, gestures and visual expression, the document interactions being related to at least one displayed document in the collaborative document area;
associate the document interactions with the at least one document based on a reference scheme applied to the collaborative document area; and
store the document interactions with the documents in a content repository, the document interactions being associated with one or more meta-data properties to facilitate searching and navigating of the content repository with respect to the document interactions.

9. The system of claim 8, wherein the computing system is configured to associate the document interactions with the at least one document by defining at least one cell in the collaborative document area that encompasses the at least one document, deploying the interaction tool for capturing document interactions in the at least one cell that is defined, and associating document interactions captured by the interaction tools with the at least one of the documents encompassed by the cell.

10. The system of claim 8, wherein the computer system is configured to associate the document interactions with the at least one document by requiring explicit identification of the at least one document to which the document interactions are directed to control an association of the document interactions with the at least one document.

11. The system of claim 8, wherein the computing system is configured to associate the document interactions with the at least one document by associating the document interactions with the one or more documents using a proximity of an avatar to the at least one document.

12. The system of claim 8, wherein the computer system is configured to retrieve at least one of the documents based on a meta-data property assigned to at least one of the document interactions.

13. The system of claim 8, wherein the computing system is configured to associate the document interactions with the at least one document by assigning a unique channel to an interaction tool for capturing document interactions, the unique channel corresponding to the at least one document.

14. A non-transitory computer readable medium storing instructions executable by a computing system including at least one computing device, wherein execution of the instructions implements a method for managing document interactions in a collaborative document area of a virtual world comprising:
- displaying one or more documents in the collaborative document area, the collaborative document area being a shared virtual space in the virtual world;
- capturing document interactions of one or more avatars, an avatar being a representation of a user in the virtual world, with the one or more displayed documents in the collaborative document area of the virtual world using an interaction tool deployed in the collaborative document area using one or more computing devices, the document interactions comprising focusing of the avatar's attention upon, gestures and visual expression, the document interactions being related to at least one displayed document in the collaborative document area;
- associating the document interactions with the at least one document based on a reference scheme applied to the collaborative document area by an interaction association unit using the one or more computing devices; and
- storing the document interactions with the documents in a content repository, the document interactions being associated with one or more meta-data properties to facilitate searching and navigating of the content repository with respect to the document interactions.

15. The non-transitory computer readable medium of claim 14, wherein associating the document interactions with the at least one document comprises:
- defining at least one cell in the collaborative document area that encompasses the at least one document;
- deploying the interaction tool for capturing document interactions in the at least one cell that is defined; and
- associating document interactions captured by the interaction tools with the at least one of the documents encompassed by the cell.

16. The non-transitory computer readable medium of claim 14, wherein associating the document interactions with the at least one document comprises assigning a unique channel to an interaction tool for capturing document interactions, the unique channel corresponding to the at least one document.

17. The non-transitory computer readable medium of claim 14, wherein associating the document interactions with the at least one document comprises requiring explicit identification of the at least one document to which the document interactions are directed to control an association of the document interactions with the at least one document.

18. The non-transitory computer readable medium of claim 14, wherein associating the document interactions with the at least one document comprises associating the document interactions with the one or more documents using a physical proximity of an avatar to the at least one document.

19. The method according to claim 1, wherein capturing document interactions of one or more avatars comprises capturing document interactions of selecting, tagging, searching for or within, conversation, discussion, dialog or commentary concerning, editing, revising, authoring, text messages, audio messages, video messages, multimedia messages, or animation.

20. The system according to claim 8, wherein the computing system is further configured to capture document interactions comprising selecting, tagging, searching for or within, conversation, discussion, dialog or commentary concerning, editing, revising, authoring, text messages, audio messages, video messages, multimedia messages, and animation.

21. The non-transitory computer readable medium according to claim 14, wherein execution of the instructions implements a method further comprising:
- capturing document interactions of selecting, tagging, searching for or within, conversation, discussion, dialog or commentary concerning, editing, revising, authoring, text messages, audio messages, video messages, multimedia messages, or animation.

* * * * *